US008089355B2

(12) United States Patent
Aaron

(10) Patent No.: US 8,089,355 B2
(45) Date of Patent: Jan. 3, 2012

(54) CONTEXT-DETECTED AUTO-MODE SWITCHING

(75) Inventor: Jeffrey Aaron, Atlanta, GA (US)

(73) Assignee: AT&T Intellectual Property I, LP, Atlanta, GA (US)

(*) Notice: Subject to any disclaimer, the term of this patent is extended or adjusted under 35 U.S.C. 154(b) by 0 days.

(21) Appl. No.: 12/625,370

(22) Filed: Nov. 24, 2009

(65) Prior Publication Data
US 2010/0066546 A1 Mar. 18, 2010

Related U.S. Application Data

(63) Continuation of application No. 11/611,434, filed on Dec. 15, 2006, now Pat. No. 7,646,297.

(51) Int. Cl.
*G08B 1/08* (2006.01)
(52) U.S. Cl. ............... 340/539.26; 340/539.22; 340/500
(58) Field of Classification Search ............. 340/539.11, 340/539.22, 539.26, 500, 506, 511, 545, 340/573.1, 573.4, 573.5; 455/414.1, 41.2; 726/24; 84/723
See application file for complete search history.

(56) References Cited

U.S. PATENT DOCUMENTS

| | | | |
|---|---|---|---|
| 4,853,628 A | 8/1989 | Gouldsberry et al. | |
| 5,505,057 A | 4/1996 | Sato et al. | |
| 6,130,707 A | 10/2000 | Koller et al. | |
| 6,567,835 B1 | 5/2003 | Blomgren et al. | |
| 6,580,914 B1 | 6/2003 | Smith | |
| 6,587,835 B1 | 7/2003 | Treyz et al. | |
| 6,853,628 B2 | 2/2005 | Chitrapu | |
| 6,892,217 B1 | 5/2005 | Hanmann et al. | |
| 6,912,398 B1 | 6/2005 | Domnitz | |
| 6,947,976 B1 | 9/2005 | Devitt et al. | |
| 6,977,997 B2 | 12/2005 | Shioda et al. | |
| 7,046,987 B2 | 5/2006 | Siegel et al. | |
| 7,109,859 B2 * | 9/2006 | Peeters | 340/539.11 |
| 7,136,658 B2 | 11/2006 | Cole et al. | |
| 7,136,688 B2 | 11/2006 | Jung et al. | |
| 7,155,238 B2 | 12/2006 | Katz | |
| 7,271,720 B2 * | 9/2007 | Tabe | 340/540 |
| 7,324,959 B2 | 1/2008 | Malkin et al. | |
| 7,570,943 B2 * | 8/2009 | Sorvari et al. | 455/414.1 |
| 7,599,795 B1 | 10/2009 | Blumberg et al. | |
| 7,634,228 B2 | 12/2009 | White et al. | |
| 7,781,666 B2 * | 8/2010 | Nishitani et al. | 84/723 |

(Continued)

OTHER PUBLICATIONS

U.S. Appl. No. 11/611,345, filed Dec. 15, 2006.

(Continued)

*Primary Examiner* — Van T. Trieu
(74) *Attorney, Agent, or Firm* — Parks IP Law LLC; Jennifer P. Medlin, Esq.

(57) ABSTRACT

An apparatus and method provide the automatic, self-configuration of a communication device to adjust to the user's environmental circumstances. Method includes creating a set of mode templates corresponding to a plurality of potential environmental circumstances and may be stored in a database in the computer readable memory of the communication device. At predetermined intervals, a suite of environmental sensors integral to the communication device may periodically sample the user's environment. The user's environmental circumstances may be derived by an analysis module based on the output of the suite of environmental sensors. The derived set of environmental circumstances may then be compared to the mode templates to determine a matching mode template. A change to a plurality of communication device operational settings may then be made based at least partially on the matching mode template.

20 Claims, 3 Drawing Sheets

U.S. PATENT DOCUMENTS

| | | |
|---|---|---|
| 7,804,980 B2 * | 9/2010 | Sasaki .................. 382/103 |
| 2002/0082931 A1 | 6/2002 | Siegel et al. |
| 2002/0095333 A1 | 7/2002 | Jokinen et al. |
| 2002/0147928 A1 | 10/2002 | Mahajan et al. |
| 2002/0178385 A1 | 11/2002 | Dent et al. |
| 2003/0006913 A1 | 1/2003 | Joyce et al. |
| 2003/0008661 A1 | 1/2003 | Joyce et al. |
| 2003/0050039 A1 | 3/2003 | Baba et al. |
| 2003/0198204 A1 | 10/2003 | Taneja et al. |
| 2004/0032503 A1 | 2/2004 | Monden et al. |
| 2004/0082351 A1 | 4/2004 | Westman |
| 2004/0092269 A1 | 5/2004 | Kivinen |
| 2004/0110515 A1 | 6/2004 | Blumberg et al. |
| 2004/0141606 A1 | 7/2004 | Torvinen |
| 2004/0209602 A1 | 10/2004 | Joyce et al. |
| 2005/0073406 A1 | 4/2005 | Easley et al. |
| 2005/0075116 A1 | 4/2005 | Laird et al. |
| 2005/0113123 A1 | 5/2005 | Torvinen |
| 2005/0117516 A1 | 6/2005 | Yang |
| 2005/0149443 A1 | 7/2005 | Torvinen |
| 2005/0153729 A1 | 7/2005 | Logan et al. |
| 2005/0176420 A1 | 8/2005 | Graves et al. |
| 2005/0181824 A1 | 8/2005 | Lloyd |
| 2005/0215238 A1 | 9/2005 | Macaluso |
| 2005/0221876 A1 | 10/2005 | Van Bosch et al. |
| 2005/0248456 A1 | 11/2005 | Britton et al. |
| 2005/0266872 A1 | 12/2005 | MacIntosh et al. |
| 2005/0288038 A1 | 12/2005 | Kim |
| 2006/0009240 A1 | 1/2006 | Katz |
| 2006/0015404 A1 | 1/2006 | Tran |
| 2006/0033625 A1 | 2/2006 | Johnson et al. |
| 2006/0089158 A1 | 4/2006 | Lai et al. |
| 2006/0095540 A1 | 5/2006 | Anderson et al. |
| 2006/0194595 A1 | 8/2006 | Myllynen et al. |
| 2006/0224863 A1 | 10/2006 | Lovett et al. |
| 2006/0253453 A1 | 11/2006 | Chmaytelli et al. |
| 2006/0268895 A1 | 11/2006 | Kotzin |
| 2007/0004393 A1 | 1/2007 | Forsberg et al. |
| 2007/0037561 A1 | 2/2007 | Bowen et al. |
| 2007/0037605 A1 | 2/2007 | Logan |
| 2007/0054387 A1 | 3/2007 | Lee et al. |
| 2007/0136796 A1 | 6/2007 | Sanchez et al. |
| 2007/0182544 A1 | 8/2007 | Benson et al. |
| 2007/0182818 A1 | 8/2007 | Buehler |
| 2007/0232342 A1 | 10/2007 | Larocca |
| 2007/0287379 A1 | 12/2007 | Matsuura et al. |
| 2008/0004951 A1 | 1/2008 | Huang et al. |
| 2008/0032677 A1 | 2/2008 | Catovic et al. |
| 2008/0045236 A1 | 2/2008 | Nahon et al. |
| 2008/0052169 A1 | 2/2008 | O'Shea et al. |
| 2008/0114778 A1 | 5/2008 | Siegel |
| 2008/0146205 A1 | 6/2008 | Aaron |
| 2008/0169921 A1 | 7/2008 | Peeters |
| 2008/0182563 A1 | 7/2008 | Wugofski et al. |
| 2008/0182586 A1 | 7/2008 | Aaron |
| 2009/0176524 A1 | 7/2009 | David |
| 2009/0203317 A1 * | 8/2009 | Waung .................. 455/41.2 |
| 2009/0292920 A1 | 11/2009 | Willey |

OTHER PUBLICATIONS

U.S. Appl. No. 11/610,890, filed Dec. 14, 2006.
U.S. Appl. No. 11/680,898, filed Dec. 14, 2006.
U.S. Appl. No. 11/610,927, filed Dec. 14, 2006.
U.S. Appl. No. 11/611,475, filed Dec. 15, 2006.
U.S. Appl. No. 11/611,517, filed Dec. 15, 2006.
U.S. Appl. No. 11/668,803, filed Jan. 30, 2007.
U.S. Appl. No. 11/627,260, filed Jan. 25, 2007.
U.S. Appl. No. 11/668,848, filed Jan. 30, 2007.
U.S. Appl. No. 11/627,269, filed Jan. 25, 2007.
Helio GPS-powered Buddy Beacon, www.helio.com, Dec. 9, 2006.
GPS Locator Phone, www.wherify.com/wherifone/kids.html?page=kids, Nov. 17, 2006.
Dodgeball.com bringing your phone to life., www.dodgeball.com, Nov. 17, 2006.
OnStar Technology, www.onstar.com/us_english/jsp/explore/onstar_basics/technology.jsp, Nov. 5, 2006.
U.S. Appl. No. 11/610,898, filed Dec. 14, 2006.
U.S. Appl. No. 11/843,854, filed Aug. 12, 2007.
Huang et al., "A Self-Adaptive Zone Routing Protocol for Bluetooth Scatternets", ScienceDirect (2004).
Leopold et al., "Bluetooth and Sensor Networks: A Reality Check" SenSys '03 (2003).
Palo Wireless "K1—Generic Access Profile", http://palowireless.com/infotooth/tutorial/k1_gap.asp (2004).
Aalto et al., "Bluetooth and WAP Push Based Location-Aware Mobile Advertising System" MobiSys '04 (2004).

* cited by examiner

CONTEXT-DETECTED AUTO-MODE SWITCHING

CROSS-REFERENCE TO RELATED APPLICATION

This application is a continuation of U.S. application Ser. No. 11/611,434, filed Dec. 15, 2006 (now U.S. Pat. No. 7,646,297), which is herein incorporated by reference.

TECHNICAL FIELD

The subject matter described herein relates to systems and methods for enabling automatic, self configuration of a communication device in order for the device to adjust to a user's environmental circumstances.

BACKGROUND

Personal communications devices have become a ubiquitous staple of today's society. The most common personal communication device is a cellular telephone but such devices may include any number of personal electronic devices such as pagers, PDA's, small laptop computers, MP3 players, radios, etc. These devices, in particular, have become an omnipresent necessity. They are carried throughout a user's day and follow the user into a myriad of environmental conditions that can range from a quiet office, to a construction site, to use on the road while driving.

Generally, communication devices such as cellular telephones are designed to allow users to change their operational settings as a user's circumstances change. An example may include changing from a ring tone to vibrate while attending an important meeting. However, users must usually alter each setting or mode manually and each operating feature must be adjusted independently. On some devices, the user may manually select a "profile" which adjusts several features simultaneously, yet this still requires manual user action. Even those devices with automatic audio gain or automatic lighting controls adjust only a single operating feature and that feature is usually adjusted independently of all other features. Further, learning how to adjust rarely changed features on a complex device requires unnecessary time and effort upon the part of the user. Learning how to manipulate a communication device will only become more difficult as the complexity of the devices allows more and more features to be added. Therefore, the appropriate and real time adjustment of the operational settings of a communications device continues to be an unnecessary impediment to the full operational potential and convenient use of a communication device.

SUMMARY

Exemplary embodiments of a communication device consistent with this disclosure may include a set or a suite of environmental sensors that is in communication with an analysis module ("AM"). The analysis module may infer the current environmental conditions of the user via the set of environmental sensors. The communication device may also include a mode switching module which is in communication with the analysis module and a plurality of operating features. The mode switching module may receive commands from the analysis module to alter the plurality of operating features based on a match between the inferred environmental conditions and a mode template.

Exemplary embodiments of a method for context based mode switching consistent with this disclosure may include creating a set of mode templates corresponding to a plurality of potential environmental circumstances. The user's environmental circumstances may be derived or inferred by an analysis module based on the output of the suite of environmental sensors. The derived set of environmental circumstances may then be compared to the mode templates to determine a matching mode template. A change to a plurality of communication device operational settings may then be made based at least partially on the matching mode template.

Further exemplary embodiments of this disclosure may include a computer readable medium upon which are recorded instructions to create a set of mode templates corresponding to a plurality of potential environmental circumstances. The user's environmental circumstances may be derived by an analysis module based on the output of a suite of environmental sensors. The derived set of environmental circumstances may then be compared to the mode templates to determine a matching mode template. A change to a plurality of communication device operational settings may then be made based at least partially on the matching mode template.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
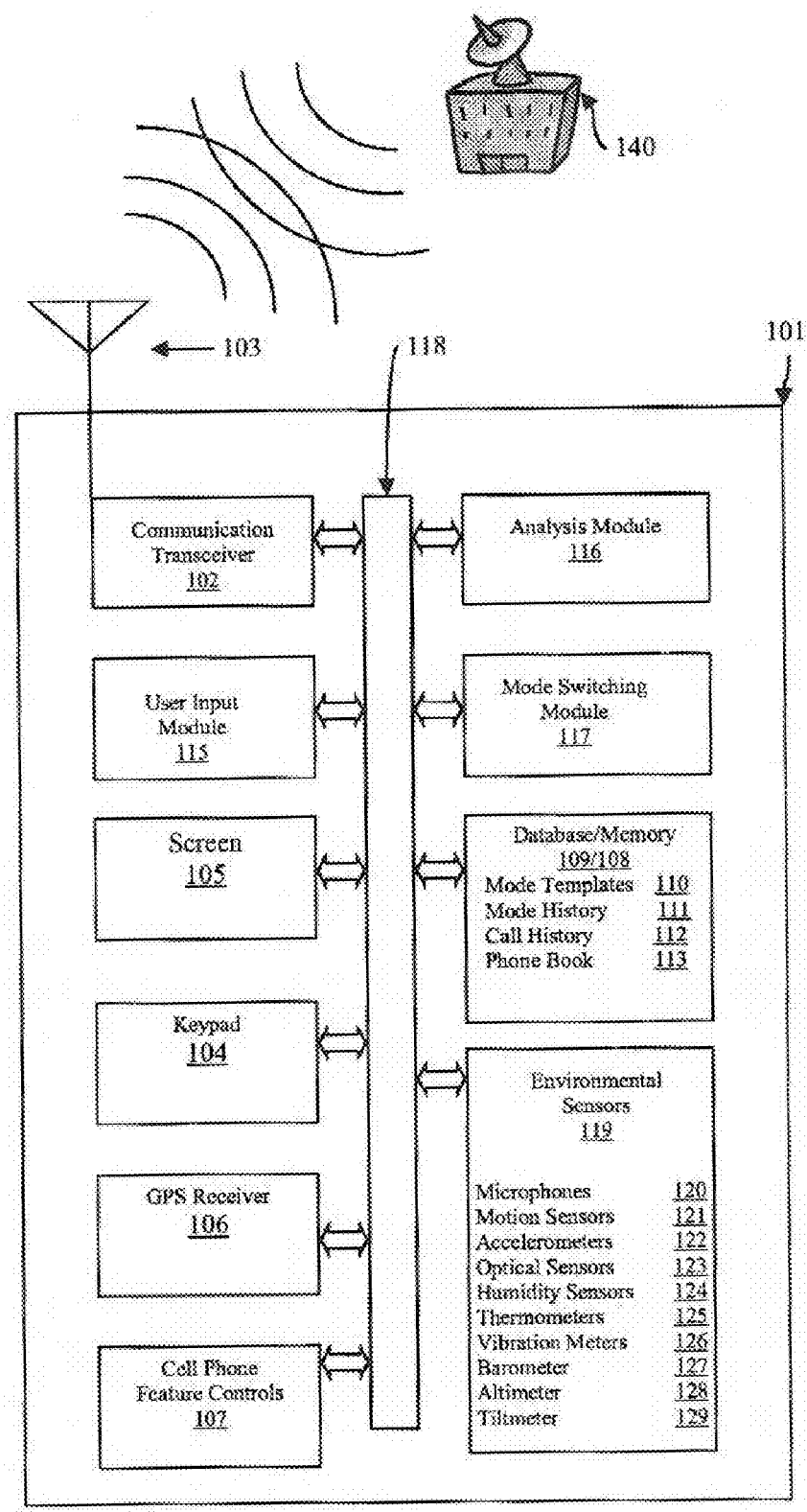
FIG. 1 is a block diagram illustrating functional components that may be found in a communications device with context based, auto mode switching capability.

The following disclosure is directed to an apparatus and method enabling the automatic, self configuration of a communication device to adjust to the user's environmental circumstances. In the following detailed description, references are made to the accompanying drawings that form a part hereof and which are shown, by way of illustration, using specific embodiments or examples. Referring now to the drawings, in which like numerals represent like elements through the several figures, aspects of the apparatus and methods provided herein will be described.

FIG. 1 is a block diagram illustrating functional components that may be found in a wireless communication apparatus or device 101. A communication device, such as a cell phone 101, may have one or more communication transceivers 102 and corresponding antennas 103. A typical communications device 101 may also have a touch screen or keypad 104 to allow a user to input commands and data into the communications device 101 and a screen display 105 with which to view data and receive responses from the communication device 101. The communication device may incorporate a Global Positioning System (GPS) receiver 106 or may be enabled to determine position by triangulation.

The communication device 101 may also have incorporated within it a variety of operational modes or features 107 that allow a user to customize the communications device 101 to the user's preferences. The list of possible operating features/modes continues to grow over time and any specific examples mentioned here are not intended to limit the potential features and modes that may be controlled by the disclosure herein. Non-limiting examples of operating features include communications speaker volume, ring tone disable, whisper tone caller ID, ring tone volume, type of ring tone, vibrate, screen intensity/brightness, lighted keypad, transfer call to voice mail, hands free, voice recognition and send/change auto e-mail response.

The communications device 101 may also include a memory device 108 upon which may be recorded a list of operating instructions and one or more databases 109. The databases 109 may contain a call history 112, stored telephone numbers, a phone book 113, mode templates 110, a mode history 111 and a set of mode filtering rules 114. The memory device 108 and the databases 109 are examples of computer readable media which store instructions that when performed implement various logical operations. Such computer readable media may include various storage media including electronic, magnetic, and optical storage. Computer readable media may also include communications media, such as wired and wireless connections used to transfer the instructions or send and receive other data messages.

The communication device 101 may have at least one microphone 120 with which a user may engage in a verbal communication with another user with a remote communication device, although there may be multiple microphones. In addition to the user's voice, the microphone 120 can be used to monitor the user's environmental noise level and its various qualities.

Additional environmental sensors may also be included in the communication device 101 individually or together in a sensor suite 119. A non-limiting set of illustrative examples of such environmental sensor types may include motion sensors 121, optical sensors 123, vibration meters 126, accelerometers 122, humidity sensors 124, thermometers 125, barometers 127, altimeters 128, and tilt meters 129. The sensor suite 119 may also include additional types of sensors as may satisfy a user's needs. Although a list of additional sensors is voluminous, non-limiting examples of additional sensors may include ion sensors such as nuclear radiation detectors (i.e. radon gas), smoke detectors, light spectrometers and audio frequency spectrum analyzers. Further, sensors may detect biometric data to monitor vital signs, voice formant, anger and the like. Non-limiting examples of biometric sensors may include a fingerprint reader, a pulseometer, a breathalyzer, a pedometer, a personal thermometer and the like.

Each sensor may be prompted or controlled by an Analysis Module ("AM"). The AM 116 may take samples of the device's 101 then current environment periodically or take samples at predetermined times. Sample periodicity may vary between sensors in the sensor suite 119, such that both the sampling frequency and the number of samples taken at each sample point may be different for different sensors. The frequency of sampling may be adjusted by the AM 116 in order to gain needed information to help in matching. Multiple samples may be desirable for some sensors so that a more accurate averaged reading can be calculated for each sample point.

Further, environmental data may be received from a communication system's central office or a substation 140. As a non-limiting example, today's temperature, cloud cover and relative humidity may be sampled at the central office 140 and transmitted to the AM 116 in the communication device 101. Sample readings that may be applicable to a wide area or that may require cumbersome sensor devices may be facilitated in this manner. Similarly, the central office 140 may be aware of an emergency in a particular area and may provide information related to the emergency that may be useful in determining a user's circumstances (e.g. a tornado warning or heavy thunderstorm).

The AM 116 may comprise a single module or several sub modules working in unison. The AM 116 may control the timing and duration of an environmental sampling. A sample may be an instantaneous/spot sample or the sample period may extend over an extended period of time as required by the analysis that is to be performed by the AM 116. The environmental samples utilized by the AM 116 in determining a user's circumstances may be a single sample from a single sensor, sequential samples taken from a single sensor or coordinated samples of any desired duration taken from multiple sensors. Samples can also be taken continually and periodically. Where sensor periodicities between sensors vary, the AM 116 may designate that one or more sensor readings remain valid until designated otherwise. The AM 116 may coordinate the sampling periodicity to optimize sensor suite performance. Further, the AM 116 may direct one or more sensors in sensor suite 119 to take immediate, ad hoc readings or a series of rapid readings. Sample times and periodicity may also be controlled by the user as a user preference. A myriad of data sampling techniques are well known in the art. Sampling methods and any illustrative examples discussed herein are not to be construed as limiting since the subject is too voluminous to be recited herein.

As non-limiting, illustrative examples of analysis, the AM 116 may directly determine the peak and average intensity levels concerning the user's audio and/or optical environment utilizing audio sensors, such as the microphone 120 and optical sensors 123 such as camera. The AM 116 may determine facts about the user's current circumstances by sampling his peak and average translational amplitude (i.e. speed), peak and average spin amplitude, and peak and average vibration. Such measurements may be conducted with inputs from the GPS 106, accelerometers 122 and the vibration meters 126. Although the GPS 106 can calculate speed when operating under good conditions such as with strong satellite signals, intermittent reception can hinder the GPS speed measurements. Therefore, it may be useful to combine a plurality of sensor inputs to determine a parameter such as speed in order to better ensure a satisfactory level of accuracy when one or more sensors is impaired or ineffective for any reason. Further, the AM 116 may utilize indicators of a user's current or past activity which may include such information as a call in progress, menu access/manipulation, searching a contact list, dialing, repeated attempts to dial and even the status of a battery charge. Note that frantic manipulation of device controls may indicate a user who should not be subject to interruptions. As such, an automatic mode change might be delayed until the frantic manipulation moderates. In such a situation the ringer could also be silenced. Similarly, the AM 116 may infer other personal attributes from orthogonal interrelationships among various sensor readings. As a non-limiting example, anger may be inferred from an elevated personal temperature and unnaturally loud voice amplitude.

Inputs to the AM 116 may include recent call and mode history. Call history may include voice communications and text messaging inputs such as who was called, who called, when calls are placed or received and with what frequency and also the length of calls. Any type of communication history may be utilized as an input. Whenever a mode is implemented, a record of the implementation may be recorded in a mode history file. A mode history file may include the date and time that a mode was implemented, a mode identifier indicating which mode was implemented and for how long the mode was implemented, and one or more environmental measurement values that were determiners in matching the mode to a particular set of environmental factors. It may also be recorded that a mode is manually overridden or cancelled by the user after implementation. Inputs listed herein are illustrative only, and non-limiting. Additional inputs may also prove useful and be included if desired.

The AM 116 may also derive aspects of the user's current environmental circumstances from calculations using samples/measurements taken by the sensor suite 119. Sample and signal processing are well known and references to such are widespread and ubiquitous in the art. Non-limiting examples of such calculated quantities potentially relevant to a determination of current circumstances may include peak-to-average ratios, variation, frequency of surpassing a threshold, spectral shape analysis via Fourier transforms of time-samples (e.g. Fast Fourier Transforms), spectral shape variation, variation rate and frequency spectrum analysis (e.g. audio, vibration and/or optical). It may also be useful to sample, compare or analyze different color CCD pixels and patterns of pixels sensed by a camera.

Further, each measured audio, motion and optical sample may be separated into sub-bands of the sensor's range, be it frequency or other type of range, by passing signals from the sensor suite 119 through stacked band-pass filters. Derived aspects may be determined via well known digital signal processing methods in addition to, or instead of, analog filtering and ratio detection techniques. The analysis techniques discussed herein are non-limiting examples of techniques that may be used within the AM 116. Other techniques that may be known to the art may be desirable to determine certain aspects.

The AM 116 may assemble the measured and derived aspects of the user's circumstances and compare the assembled aspects to one or more mode templates stored in the memory 108. The memory 108 may be integral to the communication device 101 or resident in another device in communication with the communication device 101. As mentioned above, the mode templates may be created by the user or learned over time by communications device 101. As the AM 116 accesses and compares the stored mode templates, the AM 116 may proceed to eliminate those matching dissimilar environmental circumstances utilizing a set of mode template filtering rules. As a non-limiting example, a mode template filtering rule may include a "look first rule" where a subset of the mode templates most often used/useful is examined first. Other mode filtering rules may select a mode if only a subset of the required environmental circumstances are present (e.g. any 6 of 10 environmental circumstances), or if one or more salient environmental circumstances are present (e.g. the time of day).

The Communication device 101 may include a User Input Module ("UIM") 115 whereby user input may be parsed and then used to populate and/or modify a database 109. Through the UIM 115, the user may create, delete or modify user preferences and mode templates stored in the memory 108. User preferences may be utilized to create mode templates. User preferences may be combined with the communication device's 101 historical or learned responses. The UIM 115 may also be accessed by a user web page whereby the user inputs his preferences via an internet communication with the central office 140. The central office may then download the information to the communication device 101.

The Communication device 101 may also comprise a Mode Switching Module ("MSM") 117. The MSM 117 may control the plurality of features 107 resident in the communications device 101. The MSM 117 may allow the user to adjust a feature individually via the keypad 104 and/or by the UIM 115. The MSM 117 may also control any or all features automatically upon the implementation of a mode template that has been determined to be a match to the user's current circumstances as determined by the AM 116. Communication between each of the AM 116, MSM 117, memory 108, sensor suite 119, UIM 115, Transceiver 102, GPS receiver 106 and the remaining elements in FIG. 1 may be facilitated by a Bus 118. Bus 118 may be comprised of one or a plurality of buses as is desired.

Figure 2:
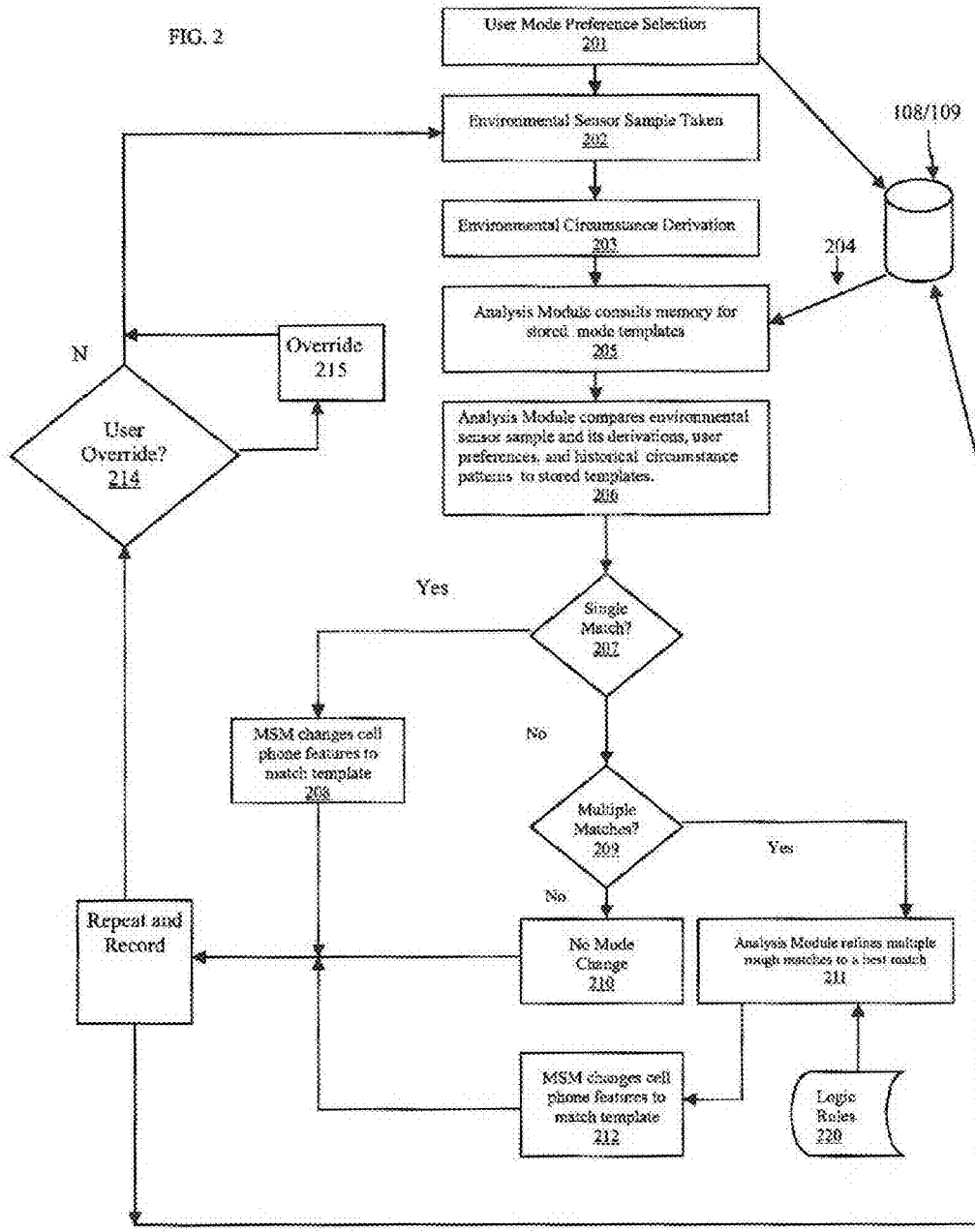
FIG. 2 is a flow illustrating an example of a method implementing context based, auto mode switching capability.

FIG. 2 provides an exemplary method implementing a context based mode switching method. The steps and process presented are exemplary. Additional steps may be added, steps broken down to component sub-steps and their order may be modified without diverting from the disclosure herein.

At process 201, a set of mode templates is created or amended. A generic set of mode templates may be initially included by the manufacturer of the communication device 101 and then modified by the user or new mode templates may be created by the user utilizing the UIM 115 and the keypad 104. The user may also create mode templates via a web page on the internet associated with the central office 140 of the service provider for the communication device 101. In addition, the communications device 101 may be constructed with additional circuitry to allow the communication device to "learn" over time and create mode templates to reflect a set of user circumstances in which the user may be surrounded. At process 204 modified or new mode templates may be stored in the memory 108.

At process 202, the sensor suite 119 takes samples of the user's circumstances via the sensors 120-129. A sample may be taken by all of the sensors 120-129 in the sensor suite 119 or any subset thereof. Samples may be taken on a predefined schedule, a periodic basis, by a command triggered by the AM 116 or a random/ad hoc basis. Samples may be spot samples, time samples, multiple sequential samples, continuous measurements or any combination thereof. The timing of a set of samples maybe controlled by a chronometer (not shown) internal to the communication device 101, one or more resettable timers (not shown) and/or may also be controlled by the central office 140. The sampling process may also conform to a sampling periodicity defined by a user 201 or the central office 140. The nature, timing and methods for taking a given set of samples is dependent upon the user's requirements and can vary widely to conform to the purposes desired. Examples of sampling techniques as discussed herein are exemplary and are not intended to limit the scope of the disclosure herein.

The sample results are processed and the user's environmental circumstances are derived at process 203. The derivation of the user's circumstances may also include accessing additional data from a remote location or from the central office 140. Sensor measurements can be processed and combined in any manner that is required. As non-limiting examples, peak amplitudes of the sensed aspect may be determined. In addition, average amplitudes, peak-to-average amplitude ratios, rates of change and frequency of events exceeding a threshold may be calculated. A frequency spectrum analysis may be useful as well as conducting spectral shape analysis resulting from Fourier Transform of time-samples. An optical analysis may be conducted by processing color and intensity of different color pixels or sets of pixels from a camera sensor. Similarly, the user's motion can be analyzed as well as any vibration. Input from a pedometer or from the GPS 106 may be other non-limiting examples of motion data input. Further, each audio, motion and optical aspect may additionally be determined and analyzed in separate sub-bands of the sensor frequency range. Digital signal processing techniques that may be employed are well known. Those techniques may be applied to the particular data of these particular embodiments to render the results used to make decisions regarding the environment and mode template.

Figure 3:
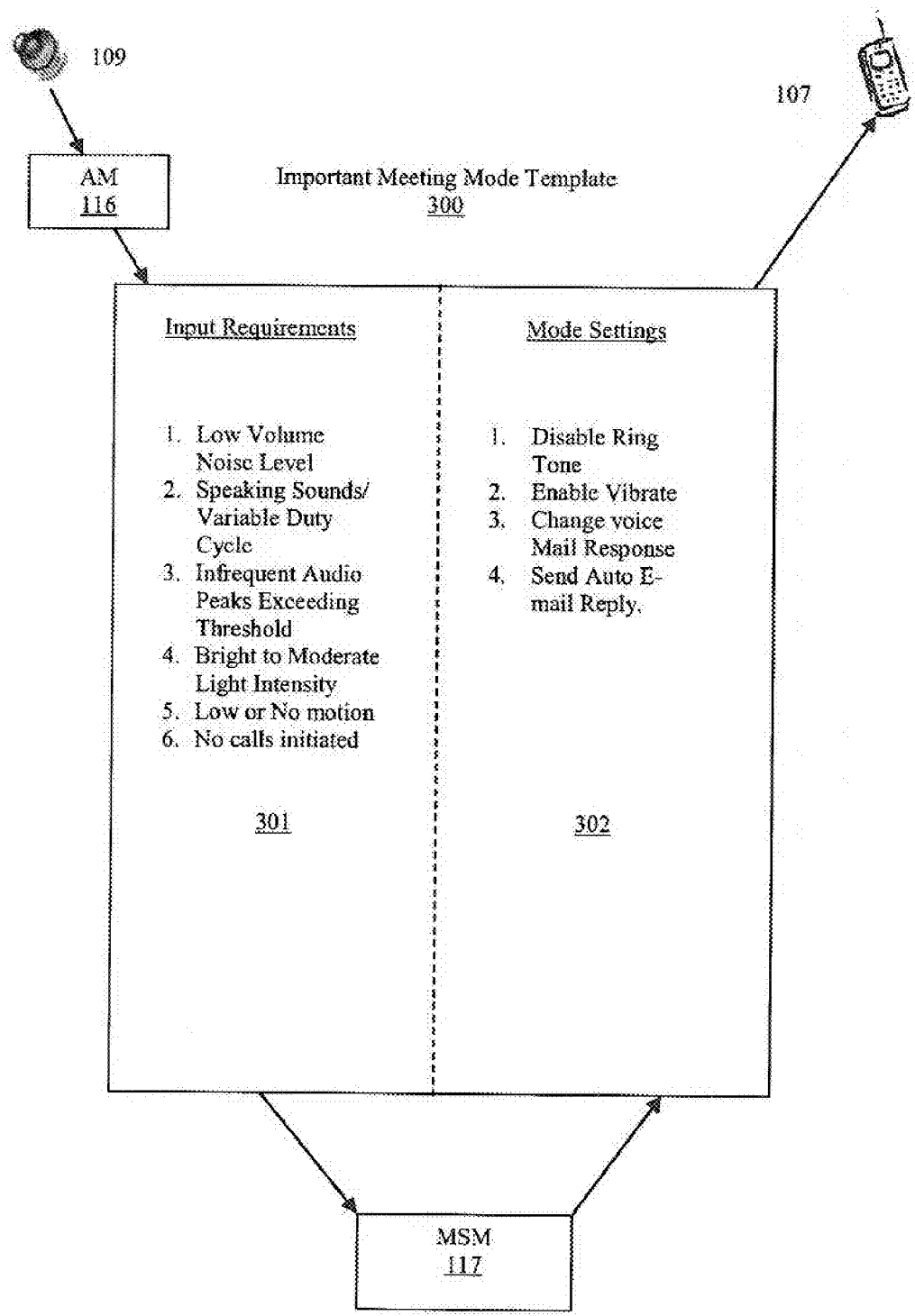
FIG. 3 is an illustration depicting the functionality of an exemplary mode template within a communication device.

In process 206, the AM 116 consults with the memory 108 for user preferences and stored mode templates 300. FIG. 3 is an abstract depiction of a mode template according to exemplary embodiments. The exemplary, non-limiting "Important Meeting Mode" template 300 may be just one of a myriad of possible mode templates that may be created. The mode templates 300 may be sets of communication device default settings, user preferences, learned responses or combinations thereof resulting in an integrated operating mode for the communication device. Each mode template reflects a desired response to a physical situation in which the user may be involved. The mode templates 300 may be organized into groups or categories. A particular mode template 300 may be associated with a certain combination of circumstances including measured or derived sensor measurements, current user activity events and historical user activity as inputs 301. The selection of an appropriate mode template may be facilitated by applying filtering logic rules 220/114 to eliminate those mode templates that do not apply to the user's immediate circumstances. The filtering logic rules 220/114 may be stored in the memory/database 108/109, a remote device or at the central office 140. The mode filtering rules 220/114 may comprise software objects, firmware, hardware or a combination thereof. Another non-limiting example of a mode template may address itself to "driving in daylight". A "driving in daylight" mode template may simultaneously:

1) increase the screen 105 contrast of the communication device 101,
2) adjust the ringer 107 from vibrate to a high volume ring tone,
3) increase the speaker 107 gain
4) optimize the microphone 120 gain with noise cancellation techniques.

Non-limiting examples of other mode templates may include "driving at night", "meeting mode", "attending a movie theater", "eating at a restaurant", "attending a raucous party", and "speed boating". The list is limitless and would be at least in part customized for each user.

Upon the receipt of the sensor inputs and user activity, the AM 116 compares the sensor inputs 119, the mode history and any user activity to the input requirements 301 of the selected mode templates in process 206. As a non-limiting example, the input requirements 301 that may correspond to the "driving in daylight" mode template may include:

1) an intense peak light level above a certain threshold
2) an average intensity over a specified time period above a certain average level set point
3) an average ultraviolet light reading above a threshold, carefully set to account for the filtering of ultraviolet light by closed car windows
4) low frequency audio input in the range of typical road and engine noise
5) high frequency audio inputs in the range of typical wind and engine noises
6) velocity above a certain threshold.

Thresholds/set points can be preprogrammed by the manufacturer, set by the user or "learned" by the communication device 101 by incorporating "learn mode" software. Learned mode software may be applied to these particular embodiments to automate the programming and the refining/readjustment of the thresholds and set points. Instances of the user "overriding" automatic mode changes, as discussed below (especially when overriding is repeated and or frequent) may be used as inputs and indicators that previously learned and set parameters require readjustment and/or refinement. Any type, number, combination and derivation of these circumstance input requirements may be utilized.

If the comparison of process 206 results in a match to a single mode template, the MSM 117 causes the features 107 associated with the particular mode template 300 to adjust to settings 302 dictated by the mode template 300. This change may be a permanent change or a temporary change that reverts to a set of default settings or to the previous settings after a specified time delay. If temporary, a subsequent sample may refresh the mode template for another period of time. If the change was permanent, a subsequent sample of the user's circumstances may either maintain the then current mode template or dictate a change to another.

If the comparison of process 206 returns multiple matching mode templates at 209, the AM 116 may refine the comparison utilizing one or more filtering logic rules 114/220 in order to select the "Best Match" template at process 211. The filtering logic rules 114/220 may be stored in the memory 108, a remote location or at the communication device's 101 central office 140. Should the comparison process 206 produce multiple equally likely mode templates, the AM 116 may resolve the choice using a more detailed but more demanding and/or time consuming analysis such as a random pick, a best guess or a default to pre-selected mode template. Further, the AM 116 may list the similar returned mode templates for a user choice. Additional non-limiting examples of the filtering logic rules 114/220 may include selecting the mode template that matches the most environmental circumstances; weighting the individual environmental circumstance measurements and/or requirements and selecting the mode template with the best match to those weighted items; and/or weighting certain combinations of measurements and/or requirements and subsequently selecting the mode template with the best "weighted" match.

If the comparison in process 206 returns no match at all, then there may be no mode change at 210. Alternately, when a no match condition has occurred or has occurred for a number of times exceeding a pre-configured threshold, the mode may be changed to a default mode. In any case, at process 213 the sampling process is reset and repeated and the change to the new mode is recorded in the database 109. The database 109 may reside in the memory 108. The database 109 may also reside in a remote location such as the communication device's 101 central office 140. The data base 109 may also be distributed amongst several memory devices in different locations.

At process 213 the mode template selected is recorded in the mode template history file and the process is repeated if the user is satisfied with the new mode template. If the user is not satisfied with the new mode that has been implemented, the user has the option to override the latest mode at process 214 initiating a manual override at process 215. The manual override may be any reasonable user input such as a verbal command or the manipulation of a button on the keypad 104. Should the user decide to override the latest mode, the communication device's feature controls 107 may be returned to the previous mode or to a default mode.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A device for switching a mode of operation of a personal communication device, comprising:
   a database for storing a set of mode templates, each mode template specifying operational settings for the personal communication device corresponding to a plurality of potential environmental circumstances;
   an analysis module for deriving a current set of environmental circumstances from an output of a set of environmental sensors included within the personal communication device and comparing the derived set of environmental circumstances to the set of mode templates to determine a matching mode template; and
   a mode switching module in communication with the analysis module for implementing a change to a plurality of operational settings of the personal communication device based at least partially on the matching mode template.

2. The device of claim 1, wherein the analysis module further derives the current set of environmental circumstances from environmental data output from a central office.

3. The device of claim 2, wherein the environmental data output from the central office includes data applicable to a wide geographical area.

4. The device of claim 2, wherein the environmental data output from central office includes data regarding an environmental emergency.

5. The device of claim 1, wherein the analysis module applies a filtering rule to eliminate non-matching mode templates.

6. The device of claim 1, wherein the database further comprises user history files, and the analysis module derives the current set of environmental circumstances based on the user history files.

7. The device of claim 1, wherein the analysis module periodically samples the environmental sensors.

8. The device of claim 1, wherein the set of environmental sensors includes at least one of:
   an audio sensor;
   a motion sensor;
   an optical sensor; and
   a weather sensor.

9. A method for switching a mode of operation of a personal communication device, comprising:
   deriving a current set of environmental circumstances from an output of a set of environmental sensors included within the personal communication device by an analysis module in communication with the set of environmental sensors;
   comparing the derived set of environmental circumstances to a set of mode templates, each mode template specifying operational settings for the personal communication device corresponding to a plurality of potential environmental circumstances, to determine a matching mode template; and
   implementing a change to a plurality of operational setting of the personal communication device based at least partially on the matching mode template.

10. The method of claim 9, wherein the set of environmental circumstances is further derived from environmental data output from a central office.

11. The method claim 10, wherein the environmental data output from the central office includes data applicable to a wide geographical area.

12. The method of claim 10, wherein the environmental data output from the central office includes data regarding an environmental emergency.

13. The method of claim 9, wherein deriving a current set of environmental circumstances includes analyzing a mode history file.

14. The method of claim 9, wherein the set of environmental sensors includes at least one of:
   an audio sensor;
   a motion sensor;
   an optical sensor; and
   a weather sensor.

15. A non-transitory computer readable medium upon which are recorded instructions that, when executed by a processor, perform acts for switching a mode of operation of a personal communication device, the acts comprising:
   deriving a current set of environment circumstances from an output of a set of environmental sensors included within the personal communication device by an analysis module in communication with the set of environmental sensors;
   comparing the derived set of environmental circumstances to a set of model templates, each mode template specifying operational settings for the personal communication device corresponding to a plurality of potential environmental circumstances, to determine a matching model template; and
   implementing a change to a plurality of operational settings of the personal communication device based at least partially on the matching mode template.

16. The computer readable medium of claim 15, wherein the set of environmental circumstances is further derived from environmental data output from a central office.

17. The computer readable medium of claim 16, wherein the environmental data output from the central office includes data applicable to a wide geographical area.

18. The computer readable medium of claim 16, wherein the environmental data output from the central office includes data regarding an environment emergency.

19. The computer readable medium of claim 15, wherein deriving a current set of environmental circumstances includes analyzing a mode history file.

20. The computer readable medium of claim 15, wherein the set of environmental sensors includes at least one of:
   an audio sensor;
   a motion sensor;
   an optical sensor; and
   a weather sensor.

* * * * *